United States Patent
Kuipers et al.

(10) Patent No.: US 9,124,723 B2
(45) Date of Patent: Sep. 1, 2015

(54) METHOD AND DEVICE FOR DATA PROCESSING IN A DIGITAL SUBSCRIBER LINE ENVIRONMENT

(75) Inventors: Martin Kuipers, Dallgow-Doeberitz (DE); Werner Kozek, Vienna (AT); Thomas Ahrndt, Ottobrunn (DE)

(73) Assignee: Adtran GmbH, Berlin-Siemensstadt (DE)

( * ) Notice: Subject to any disclaimer, the term of this patent is extended or adjusted under 35 U.S.C. 154(b) by 205 days.

(21) Appl. No.: 13/574,679

(22) PCT Filed: Jan. 21, 2010

(86) PCT No.: PCT/EP2010/050675
§ 371 (c)(1),
(2), (4) Date: Jul. 23, 2012

(87) PCT Pub. No.: WO2011/088896
PCT Pub. Date: Jul. 28, 2011

(65) Prior Publication Data
US 2012/0294348 A1    Nov. 22, 2012

(51) Int. Cl.
*H04B 3/46* (2006.01)
*H04B 17/00* (2006.01)
*H04Q 1/20* (2006.01)
*H04M 11/06* (2006.01)
*H04M 3/30* (2006.01)

(52) U.S. Cl.
CPC ............ *H04M 11/062* (2013.01); *H04M 3/304* (2013.01)

(58) Field of Classification Search
CPC ........................... H04M 11/062; H04M 3/304

USPC .......................................................... 375/224
See application file for complete search history.

(56) References Cited

U.S. PATENT DOCUMENTS

| | | | |
|---|---|---|---|
| 2008/0031313 A1 | 2/2008 | Oksman | |
| 2009/0074085 A1 | 3/2009 | Okamura | |
| 2010/0014645 A1* | 1/2010 | Feng et al. | 379/27.01 |
| 2011/0261674 A1* | 10/2011 | Maes et al. | 370/201 |

FOREIGN PATENT DOCUMENTS

| | | |
|---|---|---|
| EP | 2 037 649 A2 | 3/2009 |
| EP | 2 120 348 A1 | 11/2009 |

OTHER PUBLICATIONS

Galli, S., "Methods of Summing Crosstalk from Mixed Sources—Part I: Theoretical Analysis" IEEE Transactions on Communications, Mar. 2002, pp. 453-461, vol. 50, No. 3.
Author not named, "ITU-T 6.992.3 (Jan. 2005); Telecommunication Standardization Sector of ITU; Series G: Transmission Systems and Media, Digital Systems and Networks, Digital sections and digital line system—Access networks, Asymmetric digital subscriber line transceivers 2 ADSL2" International Telecommunication Union, ITU-T Recommendation G.992.3.

(Continued)

Primary Examiner — Freshteh N Aghdam
(74) Attorney, Agent, or Firm — Laurence A. Greenberg; Werner H. Stemer; Ralph E. Locher (57) ABSTRACT

A method and a device for data processing in a digital subscriber line environment. A virtual noise level for a digital subscriber line is determined based on measurement information of at least one network element connected to the digital subscriber line.

15 Claims, 3 Drawing Sheets

(56) References Cited

OTHER PUBLICATIONS

Author not named, "ITU-T G.992.5 (Jan. 2005); Telecommunication Standardization Sector of ITU; Series G: Transmission Systems and Media Digital Systems and Networks, Digital sections and digital line system—Access networks, Asymmetric Digital Subscriber Line (ADSL) transceivers—Extended bandwidth ADSL2 (ADSL2+)" International Telecommunication Union, ITU-T Recommendation G.992.5.

Author not named, "ITU-T G993.2 (Feb. 2006; Telecommunication Standardization Sector of ITU; Series G: Transmission Systems and Media, Digtal Systems and Networks, Digital sections and digital line system—Access networks, Very high speed digital subscriber line transceivers 2 (VDSL2)", International Telecommunication Union, ITU-T Recommendation G.993.2.

\* cited by examiner

METHOD AND DEVICE FOR DATA PROCESSING IN A DIGITAL SUBSCRIBER LINE ENVIRONMENT

BACKGROUND OF THE INVENTION

Field of the Invention

The invention relates to a method and to a device for data processing in a digital subscriber line environment.

DSL or xDSL, is a family of technologies that provide digital data transmission over the wires of a local telephone network.

High speed Internet access is gaining importance and is often realized via xDSL services using existing copper lines. Also, other applications emerge that require broadband transmission services, e.g., triple play offers comprising subscriber access to Internet, TV and voice data transmission. A bandwidth consuming application is the transmission of TV data via xDSL, e.g., one HDTV channel requires a data rate amounting to 12 Mbit/s Therefore, requirements for high speed Internet access are increasing. Operators optimize services that are offered to their customers. This becomes a difficult task as an increasing amount of users and high data rates also leads to higher crosstalk between subscriber lines in a cable binder. In most cases, crosstalk noise limits the performance. However, the actual problem is that crosstalk noise varies over time: There may be low crosstalk noise when a significant amount of customers have switched off their equipment and there may be a considerable amount of crosstalk noise during business hours when the majority of customers use their devices.

It is in particular problematic if a modem has been initialized during a low crosstalk noise period and the crosstalk noise increases during operation of the modem, e.g., by additional modems (customer premises equipments, CPEs) being activated. As a consequence, the modem that has been initialized during a time of low crosstalk experiences transmission errors and connection outages during periods of high crosstalk. Hence, the modem will have to conduct a restart retraining the noise level, which leads to a significant service interruption (e.g., up to 75 seconds), which is inacceptable for the user especially when watching television via the broadband access.

A traditional countermeasure to overcome this issue is the introduction of a large target noise margin for the modem during initialization. The high noise margin protects the system against an increasing noise level, but allows only a reduced suboptimal data rate.

Such high noise margin stabilizes the system in case the increased noise has a flat margin, i.e. in case that for the whole spectrum and for all carriers the same high target noise margin applies. If however the increased noise due to additional operating DSL services is dependent on the frequency, the maximum noise level will be different for different frequencies. Also, the data rate is dramatically reduced in case the modem is initialized using this high noise margin in a situation where the external noise from other lines is already on a high level. This high noise level leads to a reduced data rate and the large noise margin further reduces the data rate based on the fact that the target noise margin is applied on top of the measured external noise independent of its absolute level. Such kind of noise margin may however not be required when a DSL line is initialized during a situation where further increase of noise level cannot be expected.

A so-called Virtual Noise was introduced by xDSL recommendations (ITU G.993.2, G.992.3, G.992.5): An absolute Virtual Noise level is set and the maximum of external and Virtual Noise level is used by the modem during initialization instead of the measured external noise. An operator usually sets the Virtual Noise to a level of expected noise when all modems are active. Therefore, the actual noise situation does not matter when the modem is being initialized. The modem during initialization considers the maximum expected noise level, which is set by the Virtual Noise. Hence, an additional target noise margin can be set to a rather small amount since the maximum noise level is already taken into account.

It is an additional advantage of Virtual Noise that a set of breakpoints can be used to set frequency-dependent noise levels. This is an improvement over the flat noise margin and allows for higher data rates. This beneficial effect is also referred to as shaping gain.

Figure 1A:
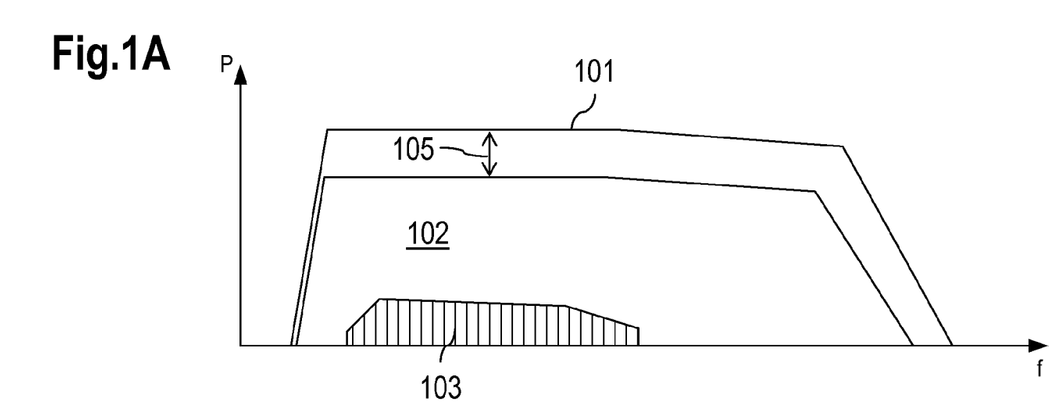
FIG. 1A shows a diagram depicting a receive power P (in a logarithmic scale) in view of a frequency f, wherein an area 102 corresponds to a data rate utilized for a particular DSL line.

FIG. 1A depicts a receive power P (in a logarithmic scale) in view of a frequency f, wherein an area 102 corresponds to a data rate utilized for a particular DSL line. The data rate is reduced by crosstalk from other lines 103 and a graph 101 indicates a theoretical maximum utilization of the spectrum, which cannot be exploited by a modem due to potential disturbances. Hence, a big margin 105 is assigned throughout the whole spectrum.

Figure 1B:
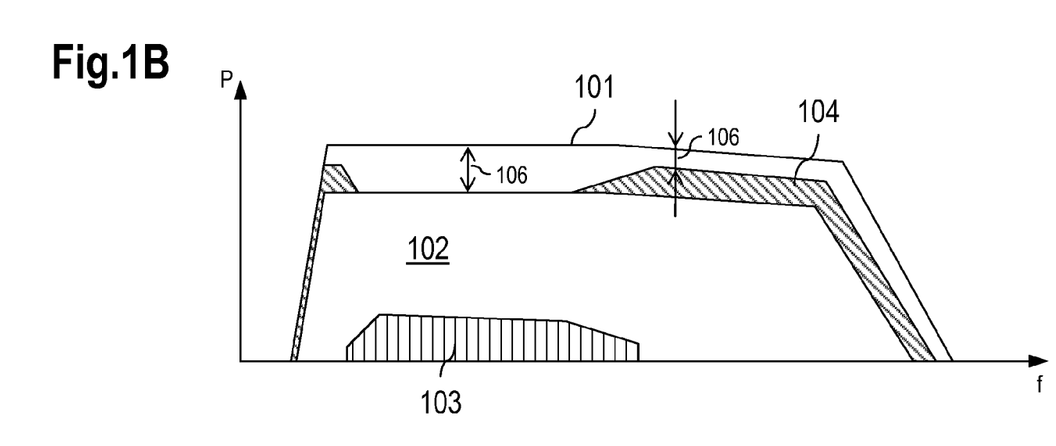
FIG. 1B shows a scenario based on FIG. 1A using Virtual Noise.

Referring now to FIG. 1B, a noise margin 106 varies due to Virtual noise. An area 104 indicates a shaping gain that could be utilized for adjusting the noise margin 106.

For an effective utilization of the Virtual Noise as shown in FIG. 1B, it is essential to become aware of the noise level that may occur. As the Virtual Noise level is set to a level higher than the noise level that will occur in reality, also the Virtual Noise will decrease the system performance. Virtual Noise is handled like real noise, therefore a high Virtual Noise level leads to a virtually reduced signal-to-noise ratio and thus to a reduced data rate.

In contrast to setting the Virtual Noise to a level too high to be reached in reality, setting the Virtual Noise to a level too low is also detrimental as an initialization of the modem would then utilize a low noise level and a bit loading algorithm assumes a high signal-to-noise ratio. This results in high data rates corresponding to the high signal to noise ratio, but an increasing noise level would exceed the noise level set by Virtual Noise and the signal-to-noise ratio declines. As a consequence, transmission errors occur and communication over the DSL line may stop. This would trigger a resynchronization leading to an interruption of service as indicated above.

BRIEF SUMMARY OF THE INVENTION

The problem to be solved is to overcome the disadvantages stated above and in particular to provide an approach to determine an efficient Virtual Noise level so that a high bandwidth is made available and still service interruptions are avoided.

This problem is solved according to the features of the independent claims. Further embodiments result from the depending claims.

In order to overcome this problem, a method for data processing in a digital subscriber line environment is provided,
 wherein a Virtual Noise level for a digital subscriber line is
  determined based on measurement information of at least one network element connected to the digital subscriber line.

Advantageously, the Virtual Noise level does not merely consider configuration data, but instead utilizes measurement information from the at least one network element, e.g., a customer premises equipment (CPE) or a digital subscriber line access multiplexer (DSLAM). It is noted that the CPE in particular refers to a device deployed at the premises of a subscriber. The CPE may comprise a modem, e.g., a DSL modem that can be initialized based on the Virtual Noise level. The DSLAM may be any centralized component, e.g., deployed at a central office or cabinet (CO), wherein the DSLAM may be connected to at least one CPE, at least to several CPEs, via a cable binder.

Advantageously, the calculation of the Virtual Noise based on the measurement information allows for an efficient utilization of the available bandwidth and at the same time avoids service interruption due to crosstalk or interference.

In an embodiment, a customer premises equipment, in particular a digital subscriber line modem, is initialized, synchronized or adjusted based on the Virtual Noise level.

It is noted that the solution suggested can be used for a first time initialization of a DSL modem as well as for the re-initialization of the DSL modem. It is also possible that the DSL modem is dynamically adjusted based (e.g., during showtime) on the Virtual Noise level.

In another embodiment, said measurement information is determined based on at least one of the following:
  a single ended line test;
  a metallic line test;
  a dual ended line test.

Measurement information determined may in particular comprise: A quite line noise (at the CO/DSLAM or at the CPE), a characteristic function of the channel or a signal-to-noise ratio.

In a further embodiment, the at least one network element comprises a DSLAM that is connected via the digital subscriber line to a CPE,
  wherein the DSLAM determines measurement information during the CPE being offline and stores this measurement information in a database; and/or
  wherein the DSLAM determines measurement information after the CPE has been activated but before the CPE enters a showtime state and stores this measurement information in the database;
  wherein the Virtual Noise level for a digital subscriber line is determined based on the measurement information stored in the database.

Such measurement information may be repeatedly determined, e.g., on regular time intervals, and stored in said database.

After the Virtual Noise level is determined, the CPE may enter its L0 state (showtime state).

In a next embodiment, the measurement information is determined during the showtime state of the CPE and it is stored in the database.

This measurement information stored in the database can thus also be utilized when the Virtual Noise level is determined. The measurement information determined during showtime state may comprise an external noise level evaluated by the CPE.

It is also an embodiment that an additional safety margin is added to the Virtual Noise level.

This additional safety margin can be utilized in case only a small amount of measurement information is available (e.g., in case the line is switched active for the first time). Such (initial) safety margin may be corrected or deleted in case of a later adjustment, e.g., during re-synchronization, of the DSL modem.

Pursuant to another embodiment, the measurement information is determined during at least one of the following modes or states of the network element:
  a diagnostic mode;
  a showtime state;
  without a customer premises equipment being attached to the digital subscriber line.

The measurement information can be determined, e.g., on a regular basis or repeatedly. Depending on the link status, different mechanisms can be used to estimate the actual noise level. In case of no CPE being attached to the line, the DSLAM can measure the noise at its side. In case a CPE is attached with its power on, but a service is not yet activated, a diagnostic mode may allow measuring the noise on both ends of the line. During showtime, various parameters can be retrieved from the CPE to estimate the current noise level.

According to an embodiment, the network element is a customer premises equipment or a digital subscriber line access multiplexer.

The digital subscriber line may in particular connect the DSLAM with the CPE.

According to another embodiment, the Virtual Noise level is determined by
  determining sequences of measurement information for different noise situations on the digital subscriber line;
  deriving a maximum noise level based on the sequences of measurement information;
  determining the Virtual Noise level based on the maximum noise level.

In yet another embodiment, the maximum noise level is derived on previous sequences of measurement information.

According to a next embodiment, a sequence of measurement information comprises measurement information for several frequency points or frequency ranges for at least one moment of time or for a period of time.

Pursuant to yet an embodiment, said Virtual Noise level is determined for upstream transmission and/or for downstream transmission.

According to another embodiment, the measurement information of the at least one network element is stored in a hierarchically compressed manner.

Hence, measurement information can be stored for a first time interval (e.g., maximum values throughout a single day) and for a second time interval (e.g., maximum values are stored for several days) and for a third time interval (the maximum values of several days are compressed to a single maximum value, e.g., the maximum value of a week, wherein a period of four weeks is represented by four maximum values), wherein first to third time intervals have different time patterns and several entries of the first time interval are condensed or compressed into a single entry of the second time interval and several entries of the second time interval are condensed or compressed into a single entry of the third time interval. Also, after a predetermined period of time, old entries can be deleted. This approach allows saving a significant amount of memory and adjusting to long-term variations of an overall noise level.

The problem stated above is also solved by a device for data processing in a DSL environment, comprising or being associated with a processing unit that is arranged such that the steps of the method stated herein are executable thereon.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps of the method as described herein.

In addition, the problem stated above is solved by a computer-readable medium, e.g., storage of any kind, having computer-executable instructions adapted to cause a computer system to perform the method as described herein.

The device may be or it may be associated with a CPE or a DSLAM.

Furthermore, the problem stated above is solved by a communication system comprising at least one device as described herein.

Embodiments of the invention are shown and illustrated in the following figures:

DESCRIPTION OF THE INVENTION

Without considering Virtual Noise, a high flat noise margin or a low defined fixed data rate is/are utilized. As the actual noise level is not known, a high noise margin is required in case the modem is initialized during low activity situations (only a few lines being active) such that the modem still has a safety margin in case the situation changed to high activity increasing the overall noise, e.g., due to crosstalk and/or interference. However, in case the modem is initialized or synchronized in a high load situation, the same safety margin would significantly reduce the attainable data rate.

Utilizing Virtual Noise, a measure has to be determined that avoids setting this Virtual noise to an inefficient value (either too low or too high). Hence, the Virtual Noise shall be set to a value that avoids resynchronizations of the modem and stills does not waste a significant amount of bandwidth by employing a safety margin that is too high.

A crosstalk level can be determined based on a FSAN model (see: S. Galli and K. J. Kerpez, "Methods of summing crosstalk from mixed sources—part I: theoretical analysis," IEEE Transactions on Communications, vol. 50, no. 3, pp. 453-461, 2002).

$$FEXT(f,n,l) = S(f) \cdot H^2(f) \cdot X_F \cdot f^2 \cdot l \cdot n^{0.6} \quad (1)$$

wherein
FEXT is a far-end crosstalk;
f is a frequency;
n is a number of disturbing systems;
l denotes a length of the cable;
XF is a scalar constant;
S(f) is a power spectral density (PSD) of interfering systems;
H(f) is a transfer function of the cable.

Equation (1) considers a maximum value of an overall crosstalk power with a confidence of 99% or, equivalently, choosing an interference power that is likely to be exceeded in 1% or less of all cases. Hence, the PSD models of FEXT for n interfering signals are determined.

Different systems or sources of crosstalk could be considered as follows:

At a given receiver, three sources of FEXT are determined. In this case there are $n_1$ systems of a spectrum $S_1(f)$ at a range $l_1$, further $n_2$ systems of a spectrum $S_2(f)$ at a range $l_2$ and another $n_3$ systems of a spectrum $S_3(f)$ at a range $l_3$. The expected crosstalk is determined as stated before, taking the base model for each source, raising it to the power of 1/0.6, adding these expressions, and raising the sum to the power of 0.6:

$$FEXT(f) = \left( (S_1(f) \cdot H_1^2(f) \cdot X_F \cdot f^2 \cdot l_1 \cdot n_1^{0.6})^{\frac{1}{0.6}} ++ \right. \quad (2)$$
$$(S_2(f) \cdot H_2^2(f) \cdot X_F \cdot f^2 \cdot l_2 \cdot n_2^{0.6})^{\frac{1}{0.6}} ++$$
$$\left. (S_3(f) \cdot H_3^2(f) \cdot X_F \cdot f^2 \cdot l_3 \cdot n_3^{0.6})^{\frac{1}{0.6}} \right)^{0.6}$$

In this case, $H_1(f)$ is the transfer function of the cable of length $l_1$ etc.

The spectra S(f) of the systems include potential transmit power reductions like downstream power back-off (DPBO) or upstream power back-off (UPBO).

This is only a simplified model and provides merely an upper limit for the sum of crosstalk components. In reality, individual FEXT components have a large variation ranging from 15 dB to 20 dB, which are not considered by this FSAN model. It is further noted that the FSAN model is calibrated as a 1% worst case model, i.e. in 99% of all cases the crosstalk is less than predicted. Hence, Virtual Noise would be set too high for nearly all cases.

Another effect of the FSAN model is that the model is dependent on the length l of the cable: Pursuant to equations (1) and (2), the FEXT level is proportional to the length l of the subscriber loop. The Virtual Noise may however be transmitter referred. Such transmitter referred Virtual Noise assumes that the DSLAM is the only noise source and that a single Virtual Noise configuration applies for a bunch or all lines. The received virtual noise PSD is determined by the transceiver as follows:

$$\text{Received...Virtual...Noise...PSD} = |H(f)|^2 \cdot TXREFVN \quad (3)$$

This means the transmitter referred Virtual Noise TXREFVN is scaled with the transfer function H(f) of the cable. This also means that the length dependency is not considered. Therefore, suitable constants have to be determined to scale the Virtual Noise in a way that it covers almost all of the noise that can occur in a cable binder. Furthermore, it is also required to adapt the scalar constant XF in equation (1) and equation (2) to the cable properties, which will be rather complex.

Hence, it may be difficult or impossible to derive a single setting that is optimal for all lines. Furthermore, the calculation of Virtual Noise has to be based on the worst case scenario in order not to cause unwanted resynchronizations for a part of the lines. This comes at the expense of a significantly lower data rate.

Thus, the approach provided herewith does not rely on using configuration data of the disturber(s) for setting the Virtual Noise. Instead, measurements and corresponding data that may already exist in the system are used to derive optimized or improved settings for the Virtual Noise.

xDSL systems like ADSL2/2plus or VDSL2 provide functions to perform different measurements for line qualification, optimization and diagnostic purposes. There are measurement functions that can be used during showtime, in a special diagnostic mode or independent of a CPE being attached to the line.

Such functions can be used to measure, e.g., on a regular basis or repeatedly, the noise on a subscriber line. Depending on the link status, different mechanisms can be used to estimate the actual noise level. In case of no CPE being attached to the line, the DSLAM can measure the noise at its side. In case a CPE is attached with its power on but not yet activated, a diagnostic mode allows measuring the noise on both ends of the line. During showtime, various parameters can be retrieved from the CPE to estimate the current noise level.

Determining the noise levels iteratively or repeatedly at given time intervals, sequences of measurements can be obtained that reflect the different noise situation on the line depending on the number of other CPEs being active at the time of the measurement. Such sequences can be used to derive the maximum noise level that can occur on a specific subscriber line. This maximum noise level is then used to calculate an optimized Virtual Noise setting for each line. Due to previous measurements, an optimized Virtual Noise setting is available even in situations when the overall noise level is rather low.

In case a new line is to be set up, the following possibilities could be applied:
(a) The new line may be pre-qualified. This means that measurements are performed on the line prior to its activation. Usually, it is known a couple of days in advance when a customer is to be connected to a line for the first time. This time period can be used to perform measurements on the DSLAM side regarding this (new) subscriber line. Even if a first estimate of the maximum noise level is less accurate, an additional margin can be added to ensure line stability on the expense of a (minor) loss of data rate. Later, when the modem has been activated and is in operation for a certain period of time, the estimate can be refined and the additional margin may become obsolete. During the next initialization of the modem, the optimized settings can be applied.
(b) In case no measurements could be conducted in advance to installing the new line, an upper limit of the crosstalk can be estimated. Usually, lines within the same cable binder experience a similar set of disturbers, whereas a coupling between lines is different. Therefore, a maximum noise level of other lines of the same cable binder and optionally an additional margin could be used for the first initialization of the new line. An optimization can be performed once a certain amount of measurements are available for this line.

Hence, a variation of the noise level can be monitored over time in order to estimate or determined a maximum level of noise and to derive a suitable setting for the Virtual Noise.

It is noted that an xDSL victim line (i.e. a line to be set up, configured or adjusted) may be a VDSL, a VDSL2, an ADSL line (in particular an ADSL2/2plus line) or the like. xDSL in this regard in particular refers to any existing or upcoming digital subscriber line standard. A disturbing line could be any kind of transmission line, e.g., xDSL, ADSL, ADSL2/2plus, SHDSL, HDB3, etc. Due to activation and deactivation of disturbing lines, the noise level on the victim line may fluctuate.

Virtual Noise can be determined for downstream transmission as well as for upstream transmission.

Figure 2:
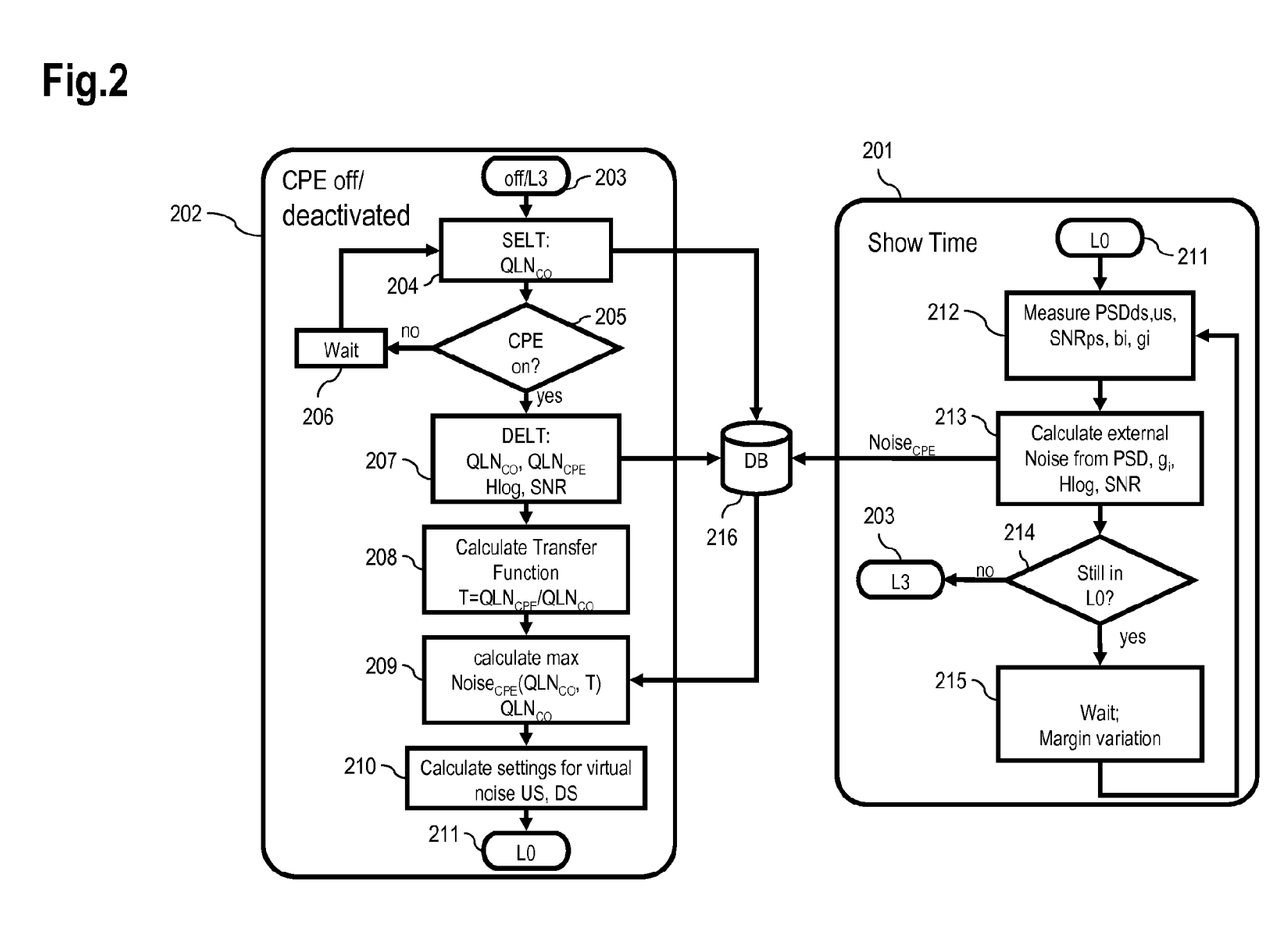
FIG. 2 shows a schematic block chart comprising an exemplary realization of a Virtual Noise determination for a particular xDSL line.

FIG. 2 shows a schematic block chart comprising an exemplary realization of a Virtual Noise determination for a particular xDSL line (also referred to as victim line).

A block 201 refers to a showtime state (L0 state) of the CPE (e.g., DSL modem). In this L0 state, user data (or user traffic) is conveyed with standard performance characteristics. A block 202 refers to a CPE that is switched off or in an L3 state. In the L3 state the modem is provisioned for the service by the operator, but it does not yet transmit any user data.

In case the CPE is switched off (state 203), the DSLAM (at a central office, CO) can conduct a Single Ended Line Test (SELT) or other testing procedures like Metallic Line Testing (MELT). The DSLAM measures a Quiet Line Noise (QLN) on the CO side of the line ($QLN_{CO}$) in a step 204. As long as the CPE is switched off, the DSLAM will measure this $QLN_{CO}$ periodically (see steps 205, 206 and 204). As a result, a sequence of measurements dependent on a frequency f representing the noise on the CO side is determined at certain points in time $t_n$: $QLN_{CO}(t_n, f)$. The measurements obtained are stored in a database (DB) 216 to be later used for Virtual Noise calculation purposes.

The DSLAM detects when the CPE is switched on. Before synchronization of the CPE, a Dual Ended Line Test (DELT) can be conducted (see step 207) to provide additional information to be used for noise level calculations. Basically, there are two possibilities to obtain the measurement data provided by such DELT:
  The line could be put in a loop diagnostic mode for conducting a dedicated DELT. As for the extended measurement periods, this dedicated DELT provides accurate results.
  A shortened version of a DELT can be performed at the beginning of each initialization that will deliver the values required, but with higher imprecision.

In particular the following values are of interest and are measured or determined:
  Measurement of QLN at the CO ($QLN_{CO}(t_n, f)$);
  Measurement of QLN at the CPE ($QLN_{CPE}(t_n, f)$);
  A characteristic function of the channel Hlog(f) (given in dB);
  A signal-to-noise ratio ($SNR(t_n,f)$).

In the following calculations the values may be provided in a linear scale (if not mentioned otherwise). It may be necessary to convert values before doing calculations in the linear scale.

For the first initialization of the CPE, a maximum noise level that occurred at the CPE is determined, wherein only a single measurement $QLN_{CPE}(t_n, f)$ is available after the DELT has been conducted. The remaining measurements $QLN_{CO}(t_n, f)$ are based on SELT measurements that have already been conducted on the CO side.

Based on the noise measured at the CO, the noise that occurred at the CPE can be determined. The noise injected at the CO side somehow translates into a noise at the CPE. This translation can be determined for the situation when the DELT was conducted, as the $QLN_{CPE}(t_{DELT}, f)$ and the $QLN_{CO}(t_{DELT}, f)$ have been measured at the same time $t_{DELT}$. Hence, a transfer function T(f) can be determined (see block 208) as follows:

$$T(f) = \frac{QLN_{CPE}(t_{DELT}, f)}{QLN_{CO}(t_{DELT}, f)} \qquad (4)$$

Due to random characteristics of the FEXT couplings between the individual pairs of lines, this transfer function T(f) cannot be directly used to derive the noise level at the CPE side for any arbitrary crosstalk situation. However, the transfer function T(f) according to equation (4) can be used to estimate an upper limit for the noise level by applying regression and smoothing to the transfer function T(f) via an operator $\mathcal{F}$:

$$T'(f) = \mathcal{F}\{T(f)\} \cdot M(f), \quad (5)$$

wherein M(f) is a heuristic correction in order to adapt T'(f) to provide more accurate estimations.

There are several possibilities for the Operator $\mathcal{F}$ to arrive at an upper estimate for the transfer function T(f). One possibility is to obtain this upper estimate from measurements that specifically apply for the type of cable used. Since the transfer function T(f) translates the $QLN_{CO}$ into an equivalent value for the $QLN_{CPE}$, measurement data from both sides of the cable can be utilized, which can be obtained either by a-priori lab measurements or by data collected during the application of the method described herein.

First, a statistical significant amount of data is collected. Next, statistical outliers are removed from the set of data. Then the random variations of the measured individual transfer functions T(f) in the frequency domain are removed by a suitable smoothing process (e.g., boxcar smoothing). Next, a probability function of the ensemble of the transfer function T(f) is estimated for each point in frequency (or for a particular frequency range). Based on this probability function a function in the frequency domain can be derived that provides an upper limit of the individual transfer functions T(f) with a predefined level of confidence (e.g., 99%).

M(f) is a heuristically determined additional margin to consider random variations in the frequency of the transfer functions.

Hence, a maximum noise level can be estimated (see step 209):

$$N_{CPE}(t_n, f) = QLN_{CO}(t_n, f) \cdot T'(f)$$

and $$\max(N_{CPE}(f)) = \max(N_{CPE}(t_n, f)) \quad (6)$$

It is noted that the maximum is determined across different $t_n$ for each point of frequency f.

In a next step 210, the value $\max(N_{CPE}(f))$ can be used to determine the Virtual Noise for upstream (US) and downstream (DS).

A Virtual Noise (VN) that is transmitter referred can be described as $$VN_{DS} = \frac{\max(N_{CPE}(f)) \cdot A(f)}{|H(f)|^2} \text{ and} \quad (7)$$

$$|H(f)|^2 = 10^{Hlog(f)/10},$$

where A(f) can be used to provide an additional noise margin.

The noise margin may protect the system against an increasing noise level due to additional xDSL services on other lines. Since the maximum noise level has already been considered in the Virtual Noise settings, a large margin may thus not be required.

However, a (minor) additional noise margin could be provided to protect the system against unforeseen events (e.g., bursty noise or uncontrolled initialization of other CPEs). Therefore, a tradeoff between Virtual Noise (adaptation of A(f)) and an additional noise margin may apply.

After step 210, the CPE enters the L0 state 211 and the modem is in showtime (see also block 201).

During showtime, a couple of measurements can be derived from the CPE itself (see step 212). Such measurement values can be determined, e.g., on a regular basis. An actual external noise level can be determined as follows (see step 213):

$$N_{CPE}(t_n, f) = \frac{PSDds(f) \cdot g_i(t_n, f) \cdot |H(f)|^2}{SNRps(t_n, f)}, \quad (8)$$

wherein
PSDds(f) is a transmit power spectral density used in downstream direction;
$g_i(t_n, f)$ represents fine gains actually used by the system;
$SNRps(t_n, f)$ provides a signal-to-noise ratio per subcarrier of a subcarrier group.
Also, bit loading bi can be used to derive SNR values.
Again, this noise $N_{CPE}$ is stored in the database DB 216 for later usage.

In a step 214 it is checked whether the CPE is still in the L0 state. In the affirmative, a wait cycle is processed in a step 215 before it is branched to step 212. This wait cycle may be used to vary the margin.

The step 215 may in particular be a waiting state that allows the measurements to be conducted periodically. Thus, the step 215 may introduce a delay, e.g., of minutes.

If the result of step 214 indicates that the CPE is no longer in L0 state, it is branched to L3 state 203.

The details provided supra are in particular applicable for calculating downstream Virtual Noise ($VN_{DS}$). Upstream Virtual Noise can be determined in an analogue manner. Since the SELT measures the QLN directly at the central office ($QLN_{CO}(t_n, f)$), the values obtained can be directly used to estimate the maximum noise level in upstream direction for the first initialization. During showtime the processing of upstream SNR values is identical to equation (8) for downstream:

$$N_{CO}(t_n, f) = \frac{PSDus(f) \cdot g_i(t_n, f) \cdot |H(f)|^2}{SNRps(t_n, f)} \quad (9)$$

wherein
PSDus(f) is a transmit power spectral density used in upstream direction.

Hence, time sequences of noise levels in upstream and downstream can be determined that reflect the different situations on the line. As pointed out before, a maximum noise level could be used for all frequencies in a subsequent initialization. However, the maximum level taken over all measurements may not be the best choice as it might merely be based on a single (short) event (e.g., ingress noise or defect hardware). Furthermore, the overall noise level may permanently decrease with old systems are being successively switched off and replaced by new ones. Therefore, an all-time high value may not be an adequate selection of the noise level for Virtual Noise calculations. Instead, a noise value can be selected that does not reflect singular (short) high noise events and that does consider an overall (long-term) change of the noise level. This can be achieved, e.g., by selecting a maximum noise level for each point of a frequency range over a certain time interval (e.g., 4 weeks). In addition, not only the maximum noise value is stored, but noise values for each time (and frequency) interval can be stored. It is also possible that noise values stored before a predefined time are deleted.

Figure 3:
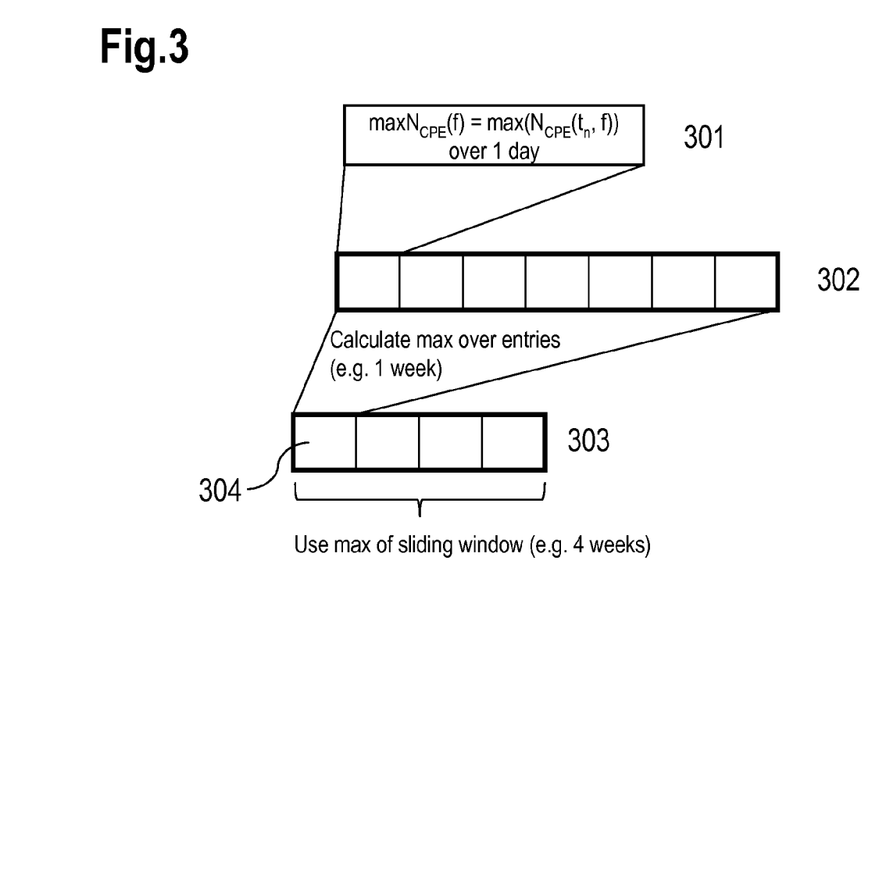
FIG. 3 shows a schematic diagram visualizing a hierarchical compression of measurement data that could be used for determining the Virtual Noise.

FIG. 3 shows a schematic diagram visualizing a hierarchical compression of measurement data that could be used for determining the Virtual Noise.

Storing measurement data over a period of, e.g., four weeks will occupy a significant amount of memory, in particular if it is done for all lines. In order to save memory, the measurement data can be hierarchically compressed.

The given example shows three levels of compression: In a first step measurement data 301 are collected (e.g., stored in the database 216 shown in FIG. 2) on a single day basis. When a new measurement data is received it can be compared with the already stored data and the maximum value is determined and stored for that day. It is noted that the maximum values can be determined for several frequency points or frequency ranges (indicated by "f" in equation (6) as well as in data 301). Hence, if a newly determined or received noise level for a certain frequency point or range is larger than the already stored maximum, this newly determined value will be stored as the new maximum for that frequency point (for the day).

The subsequent hierarchy level 302 schematically depicts seven entries, each representing the maximum for a single day. The whole week could be compressed to a single entry 304 comprising the highest values for the noise levels (for each frequency point or range) for the whole week 302.

Daily maxima that are older than one week could be deleted.

A third level of compression 303 comprises entries, each representing a maximum of a whole week. This level of compression 303 may utilize a sliding window of, e.g., four weeks, to determine an overall maximum from the past four weeks. Any data older than four weeks could be deleted.

This compression scheme saves a significant amount of memory, but it still offers a high degree of flexibility determining maxima over a predefined time interval. It is further possible to weight the data according to their age, e.g., older data may be assigned less weight than more actual data.

This compression scheme is merely an example; instead of the mentioned time intervals (day, week, 4 weeks), any other time interval or different levels of hierarchy may apply. In addition, different measurement criteria may apply, regarding frequency points, frequency ranges, etc.

Advantageously, the approach described determines the Virtual Noise not merely based on worst case crosstalk formulas, but determines a much more accurate Virtual Noise level based on an actual coupling between lines. Therefore, a higher data rate can be achieved with the lines being more stable against outage due to crosstalk or interference. In addition, no particular configuration or knowledge of the disturbing services used is required. The approach thus saves OPEX and especially helps operators that are not aware of the services that are actually used in a cable binder.

LIST OF ABBREVIATIONS

ADSL Asymmetric Digital Subscriber Line
CLEC Competitive Local Exchange Carrier
CO Central Office
CPE Customer Premises Equipment
DB Database
DELT Dual Ended Line Test
DPBO Downstream Power Back-Off
DS Downstream
DSL Digital Subscriber Line
DSLAM Digital Subscriber Line Access Multiplexer
FEXT Far End Crosstalk
HDTV High Definition Television
OPEX Operational Expenditure
PSD Power Spectral Density
QLN Quiet Line Noise
SELT Single Ended Line Test
SNR Signal-To-Noise Ratio
UPBO Upstream Power Back-Off
US Upstream
VDSL Very High Speed Digital Subscriber Line
VN Virtual Noise
xDSL any type of Digital Subscriber Line (DSL)

The invention claimed is:

1. A method for data processing in a digital subscriber line environment, the method which comprises:
determining a Virtual Noise level for a digital subscriber line based on measurement information of at least one network element connected to the digital subscriber line, the at least one network element including a digital subscriber line access multiplexer that is connected via the digital subscriber line to a customer premises equipment;
determining, with the digital subscriber line access multiplexer, measurement information while the customer premises equipment is offline and storing the measurement information in a database;
determining with the digital subscriber line access multiplexer measurement information after the customer premises equipment has been activated but before the customer premises equipment enters a showtime state, and storing the measurement information in the database; and
determining the Virtual Noise level for the digital subscriber line based on the measurement information stored in the database.

2. The method according to claim 1, which comprises initializing, synchronizing, or adjusting a customer premises equipment based on the Virtual Noise level.

3. The method according to claim 2, wherein the customer premises equipment is a digital subscriber line modem.

4. The method according to claim 1, which comprises determining the measurement information based on one or more of the following:
a single ended line test;
a metallic line test;
a dual ended line test.

5. The method according to claim 1, which comprises determining the measurement information during the showtime state of the customer premises equipment and storing the measurement information in the database.

6. The method according to claim 1, wherein the at least one network element comprises a digital subscriber line access multiplexer that is connected via the digital subscriber line to a customer premises equipment, and the method comprises determining the measurement information during showtime state of the customer premises equipment and storing the measurement information in a database.

7. The method according to claim 1, which further comprises adding an additional safety margin to the Virtual Noise level.

8. The method according to claim 1, which comprises determining the measurement information during at least one of the following modes or states of the network element:
a diagnostic mode;
a showtime state;
without a customer premises equipment being attached to the digital subscriber line.

9. The method according to claim 1, wherein the network element is a customer premises equipment or a digital subscriber line access multiplexer.

10. The method according to claim 1, wherein the step of determining the Virtual Noise level comprises:
   - determining sequences of measurement information for different noise situations on the digital subscriber line;
   - deriving a maximum noise level based on the sequences of measurement information; and
   - determining the Virtual Noise level based on the maximum noise level.

11. The method according to claim 10, which comprises deriving the maximum noise level on previous sequences of measurement information.

12. The method according to claim 10, wherein a sequence of measurement information comprises measurement information for several frequency points or frequency ranges for at least one moment of time or for a period of time.

13. The method according to claim 1, wherein the step of determining the Virtual Noise level comprises determining the Virtual Noise level for upstream transmission or for downstream transmission.

14. The method according to claim 1, which comprises storing the measurement information of the at least one network element in a hierarchically compressed manner.

15. A device in a digital subscriber line environment, the device comprising a processing unit connected to a memory, the processing unit configured to execute thereon the method according to claim 1.

* * * * *